J. TESSIER.
PHOTOGRAPHIC PLATE HOLDER.
APPLICATION FILED MAY 3, 1920.
1,398,951.
Patented Nov. 29, 1921.
2 SHEETS—SHEET 1.
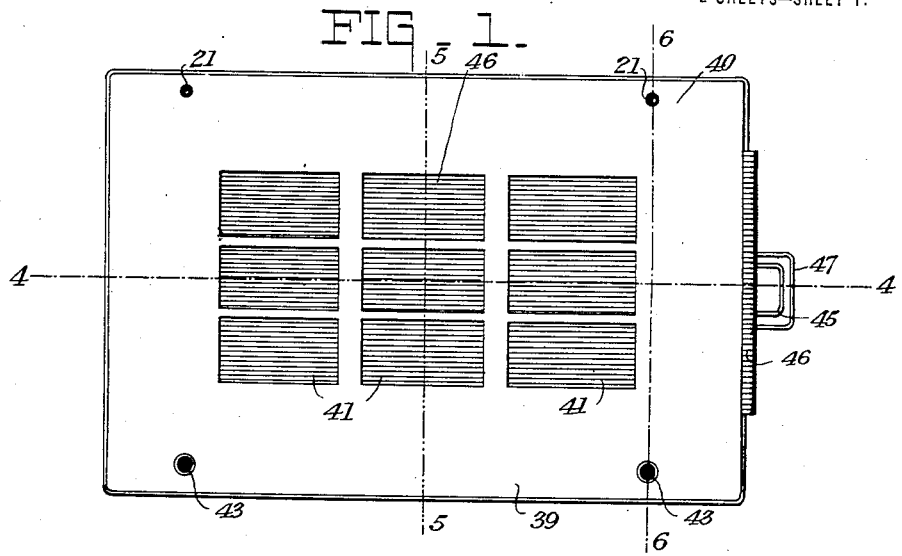
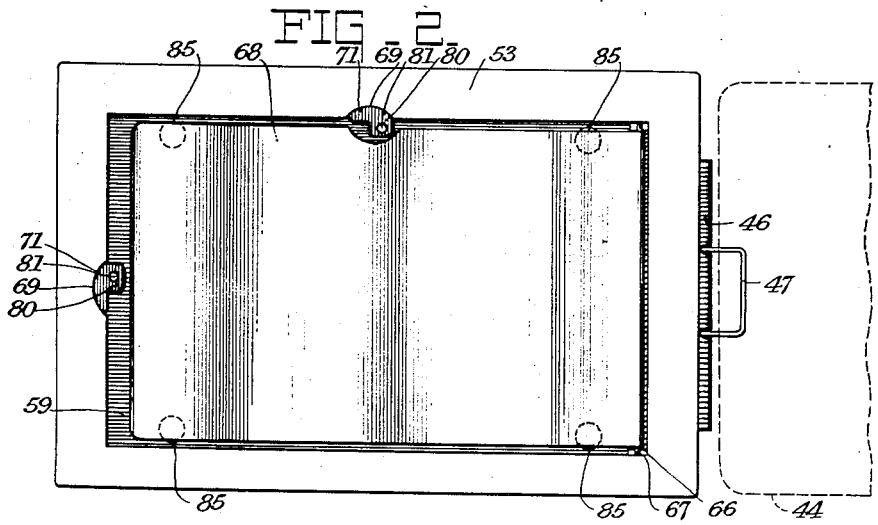
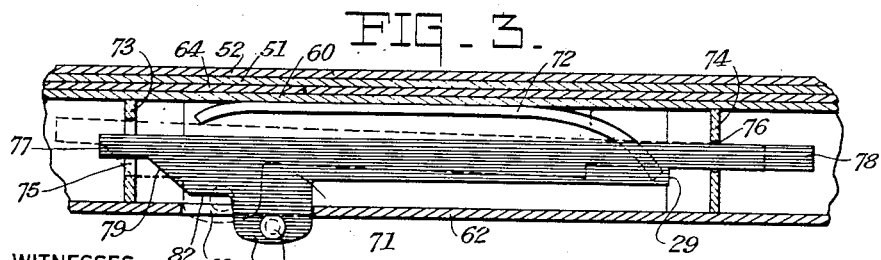
WITNESSES:
INVENTOR
Julien Tessier,
BY
ATTORNEYS.

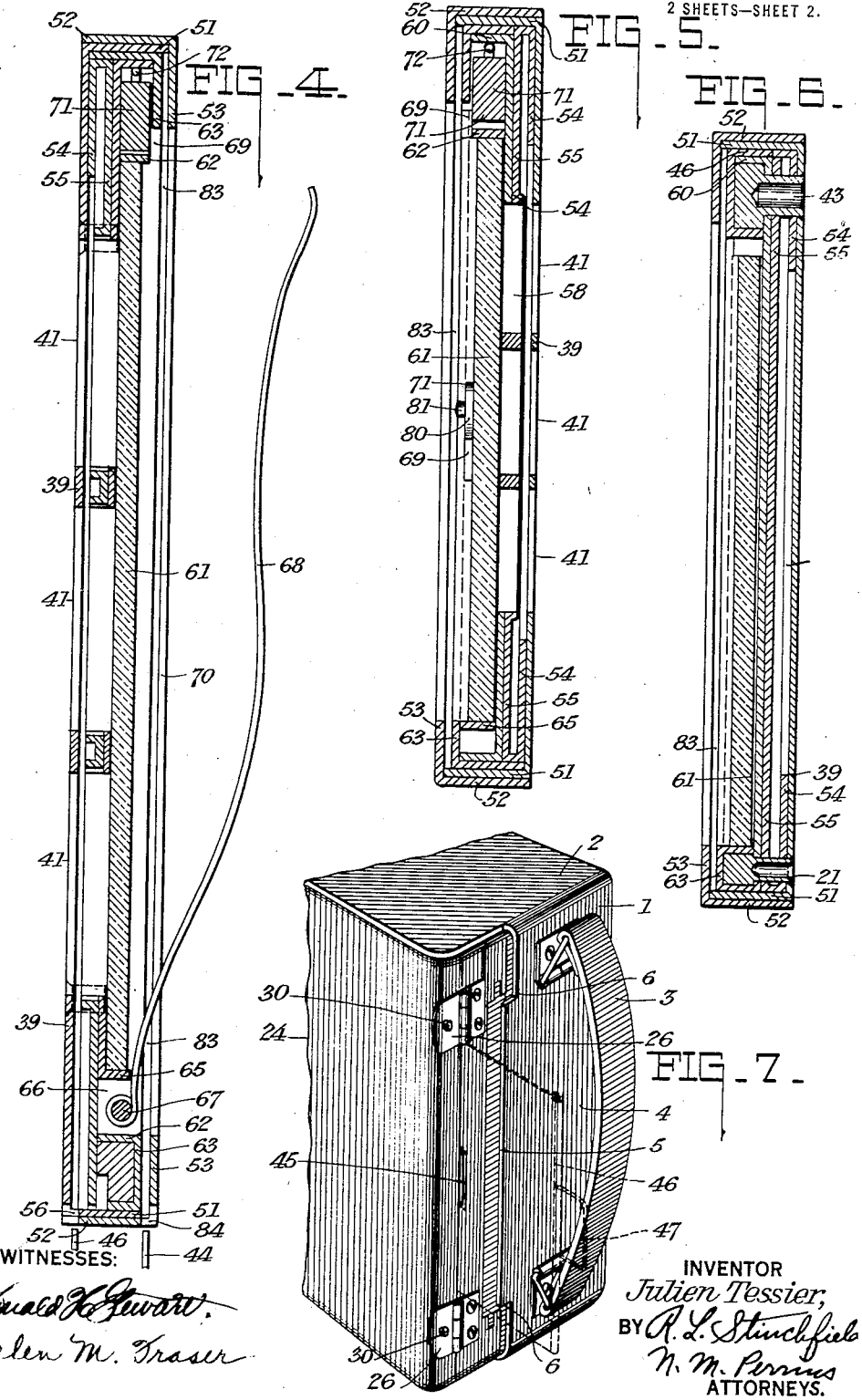

UNITED STATES PATENT OFFICE.

JULIEN TESSIER, OF ROCHESTER, NEW YORK, ASSIGNOR TO EASTMAN KODAK COMPANY, OF ROCHESTER, NEW YORK, A CORPORATION OF NEW YORK.

PHOTOGRAPHIC-PLATE HOLDER.

1,398,951. Specification of Letters Patent. Patented Nov. 29, 1921.

Application filed May 3, 1920. Serial No. 378,613.

*To all whom it may concern:*

Be it known that I, JULIEN TESSIER, a citizen of France, residing at Rochester, in the county of Monroe and State of New York, have invented certain new and useful Improvements in Photographic-Plate Holders, of which the following is a full, clear, and exact specification.

This invention relates to a photographic plateholder and particularly one in which it is desirable that the plate be accurately located during exposure. The embodiment of my invention here described is particularly adapted for use with a camera back that is fully shown and described in my companion application, Serial No. 378,612, filed May 3, 1920; the plateholder and back being coöperating parts of and intended especially for use with a camera designed to take three simultaneous color records, and shown and described in my companion application, Serial No. 378,611, filed May 3, 1920.

The objects of my invention are to provide a plateholder which is particularly easy to load and unload in darkness, this being necessary when plates sensitive to all colors are used; into which the plate may be inserted flatwise into an open seat where it may be conveniently and accurately located in proper exposure position; which will have a spring for pressing the plate into the proper plane for exposure, the spring being rendered operative by the insertion of a slide into the opening in the rear of the holder. To these and other ends, my invention resides in the improvements hereinafter fully described and pointed out in the appended claims.

Reference will now be made to the appended drawings, in which the same reference characters refer to the same parts throughout:

Figure 1 is a front view of my improved plateholder;

Fig. 2 is a rear view of the same with the rear slide removed;

Fig. 3 is a detail of a spring pressure member;

Fig. 4 is a section taken on line 4—4 of Fig. 1;

Fig. 5 is a section on line 5—5 of Fig. 1;

Fig. 6 is a section on line 6—6 of Fig. 1;

Fig. 7 is a perspective fragmentary view of a camera having a back particularly adapted for my improved plateholder.

A camera case, described more fully in my application above referred to, is indicated at 1. It has an upper surface 2, and the usual carrying handle 3. In its side wall 4, terminating at 5, are cut-out portions 6, and slidable past these parts is the back 24 particularly described in my companion application and adapted for the plateholder 40 hereinafter described. The end of the back shown is part of a door held in place by latches 26 engaging pins 30 thereon.

This plateholder 40 has a front plate 39 in which are three series of three apertures each, designated 41, intended to be exposed one series at a time in the camera referred to, so that the sensitive plate will eventually contain three color records of three subjects.

The plate 39 is turned up at its edges to form flanges 51 fitting within flanges 52, of a plate 53 forming the rear of said plateholder. Immediately behind the plate 39, is a plate 54 doubled over upon itself to form a sheath, the rear sheet of said plate being designated 55. Into a central aperture in 54 a dark slide 46 having a handle 47 may be inserted through a slot 56 in the plateholder.

Within the flanges 51 is located a frame member 63 registering with the frame formed by apertured plate 53 on the rear of the holder. This frame 63 has flanges turned in a direction opposite to flanges 51 and lying within the latter around the periphery of the holder. The internal rim of the frame has also downturned flanges 62 in registry with the edges of the aperture 70 in plate 53. Immediately behind plate 55 is a plate 59 having flanges 60 which on one end and both sides lie just within flanges 64 but are oppositely directed. Plate 59 is substantially shorter than frame 63 and one end flange 65 lies across the aperture 70 in plate 53 and across the frame member 63. In the space 66, between this flange 65 and the corresponding flange 62, is mounted a crossbar 67 on which a resilient sheet metal plate 68 of wavy form is hingedly mounted, one end thereof being bent around the crossbar. Flange 65 and the opposite end flange 62 and the two side flanges 62 constitute a seat for the sensitized plate 61. The flange 65 and one side flange 60 constitute abutments against which the plate may be positioned.

The other side and end flanges 60, and the corresponding sides of frame 63 and plate 53 have cut-out portions at 69. Between flanges 62 and 60 at these points and protruding through the apertures 69 are members 71 pressed by springs 72. These constitute resilient pressure members adapted to hold the plate in proper position by pushing it into contact with the other side and end walls which act as abutments. Between the flanges 60 and 62 are partitions 73 and 74 having apertures 75 and 76 respectively and the member 71 has end extensions 77 and 78 projecting through these apertures respectively. Near extension 78 is a shoulder 29 to engage the partition 74. Near extension 77 is a bevel 79 to engage partition 77. A tongue 80 protrudes through opening 69 and carries a finger piece 81. Near bevel 79 is a shoulder 82. When member 71 is engaged by the finger piece and moved to the left in Fig. 3, the bevel 79 engages the wall of the aperture and rides up on it until the shoulder 82 rests on the edge thereof, at which time the edge of tongue 80 engages the edge of aperture 69. The engagement of shoulder 82 with the edge of aperture 75 will maintain member 71 in retracted position within the wall, but it can be easily moved therefrom and the member 71 will merely act as a resilient pressure member. The end of spring 72 engages in an aperture of member 71 and tends to force it outwardly, but not in a longitudinal direction. It is, however, free to be moved as described to the position shown in dotted lines in Fig. 3.

Between plate 53 and plate 63 is a space 83 which opens at one end in a slot 84 at the end of the holder, and a slide 44 with a handle 45 may be inserted in this slot and space. As the forward end of this slot is pushed past the hinged end of plate 68, it engages the plate and pushes it over so that it is caused to press upon the sensitized plate 61 within the holder.

Mounted within the front of the holder are projections or studs 85 which project slightly above plate 59 and provide four small areas against which the front of the sensitive plate contacts. Also in the front of the holder are tubular blocks or socket members 43 adapted to engage suitable pins in the camera back, not here shown, and hold the plateholder in proper registration in the back. This also functions as an expanding rivet, and it and the expanding rivet 21 hold the parts rigidly together.

In use, the operator before turning off the light in the dark room will withdraw slide 44; and spring plate 68, now rendered inoperative, will swing out through the aperture 70, and leave the seat for the sensitive plate entirely free and unobstructed. The user will also push back the latches 71 so that they will be retracted in the walls, thus leaving a space substantially larger than the plate to be inserted. The light will then be extinguished and the plate removed from its container and placed flatwise directly into the plateholder. When it is in the seat, the user will press the finger pieces 81 to release the latches. As the glass side of the plate is then uppermost the user's fingers cannot touch the emulsion. The resilient pressure members will force the plate against the opposite abutment walls, properly positioning it. This movement will not mar the sensitive emulsion because the plate contacts only the small areas of the projections 85 which are sufficiently removed from the exposure openings so that any slight movement of the plate on them will not result in a mark opposite an exposure window.

There are thus provided three sets of abutments with spring pressure members acting to locate the plate against each, the three pressure members acting in directions at right angles to each other. When the plate is in position, the user will push in the slide 44, which may have been either entirely drawn or withdrawn only far enough for its end to clear opening 70. The front end of the slide will in its movement engage spring plate 68 and automatically render it operative in the manner already described, the user giving no attention to this action, as the mere act of placing the slide in position will accomplish it.

The plateholder, thus loaded, will be inserted in the camera back in the manner described in my companion application. As there pointed out, the slide 46, being narrower than slide 44, can be withdrawn from camera 1, but the slide 44 is wider and engages certain abutments, in back of and in registry with the latches 26 shown in Fig. 7. Hence slide 46 can alone be withdrawn when the camera is loaded, thus insuring that, if a slide is withdrawn, it is the correct slide. It is to be noted moreover that handle 47 of slide 46 is larger than handle 45 of slide 44, and the user is for that reason assisted in selecting the right handle when using the camera.

While I have shown and described in detail the particular structure of this embodiment of my invention, it is obvious that the features thereof are useful in plateholders and on cameras of a type differing widely from that here shown, and I contemplate as within my invention all such adaptations, modifications and substitutions of mechanical equivalents as reasonably fall within the scope of the appended claims. Where reference is made to a sensitive plate, it is, of course, understood that the term implies no limitation to the characteristics and structure of the support or the sensitive emulsion, many types of which are known, and are capable of use in plateholders falling within the scope of my invention.

Having thus described my invention, what I claim as new and desire to secure by Letters Patent is:

1. A photographic plate holder having a front wall with an exposure opening, a spring permanently attached to the holder, a removable back for the holder independent of the spring, the spring being inoperative when the back is removed, but operative to press an inserted plate into contact with the front wall when the back is in place on the holder.

2. A photographic plate holder having a front wall with an exposure opening, and having a back with an opening through which a sensitive plate may be inserted flatwise, a slide adapted to close said rear opening, a spring permanently connected to the holder and inoperative when said slide is removed, and rendered operative to press an inserted sensitive plate into contact with the front wall of the holder when said slide is in position.

3. A photographic plate holder having a front wall with an exposure opening therein, and a seat for a sensitive plate, said holder having a rear opening larger than said seat, a resilient sheet pivoted to said holder to one side of said seat, a slide insertible into the holder from the side thereof to which the sheet is pivoted, said sheet being free to swing out through said rear opening to permit the insertion of a sensitive plate when the slide is withdrawn, but forced into said holder when the slide is inserted so as to press an inserted plate against the front wall of the holder.

4. A photographic plate holder comprising a frame having side and end walls within which a plate may be inserted, one of the ends walls and one of the side walls serving as abutments, and spring pressed members carried by the other side and end walls and adapted to press an inserted plate against the first namel walls, said members being adapted to be withdrawn into the walls by which they are carried and to be latched therein in inoperative position.

5. A photographic plate holder having front, side and end walls, said front wall having an exposure opening and projections of relatively small area, one end wall and one side wall adapted to serve as abutments and the other end and side walls having resilient pressure members adapted to contact the edges of a plate and press the plate against the abutment walls, and a spring adapted to overlie an inserted plate and press the same against the projections.

6. A photographic plate holder comprising a frame having side, end and front walls, said front wall having an exposure opening, and having studs protruding above its surface, one side wall and one end wall carrying resilient members adapted to press an inserted sensitive plate against the other side and end walls, a resilient sheet metal plate hinged at one side of the frame and adapted to be swung entirely away from said frame, so that a plate can be directly inserted therein, and a cover for said frame adapted to be secured in position and to hold the pivoted plate in resilient contact with the inserted plate so as to force the front thereof against the said abutments, whereby the plate is definitely located and held in position in three directions at right angles to each other.

7. A photographic plate holder having in its front an exposure opening, and in its back an opening through which a sensitive plate may be inserted flatwise into the holder, two slides, one adapted to close each of said openings, the slides being insertible from the same end of the holder, said slides being of different widths.

8. A photographic plate holder having in its front an exposure opening and in its back an opening through which a sensitive plate may be inserted flatwise into the holder, two slides, one adapted to close each of said openings, the slides being insertible from the same end of the holder, said slides having at that end handles of different dimensions.

Signed at Rochester, New York, this 29th day of April, 1920.

J. TESSIER.